United States Patent [19]
Martinson et al.

[11] 3,800,130
[45] Mar. 26, 1974

[54] FAST FOURIER TRANSFORM STAGE USING FLOATING POINT NUMBERS

[75] Inventors: Lloyd William Martinson, Haddonfield; Richard James Smith, Delran, both of N.J.

[73] Assignee: RCA Corporation, New York, N.Y.

[22] Filed: July 9, 1973

[21] Appl. No.: 377,312

[52] U.S. Cl. .................................. 235/156, 235/164
[51] Int. Cl. .......................... G06f 7/48, G06f 15/34
[58] Field of Search ............ 235/156, 159, 160, 164

[56] References Cited

UNITED STATES PATENTS

| | | | |
|---|---|---|---|
| 3,588,460 | 6/1971 | Smith | 235/156 |
| 3,673,399 | 6/1972 | Hancke et al. | 235/156 |
| 3,697,734 | 10/1972 | Booth et al. | 235/164 |
| 3,725,649 | 3/1973 | Deerfield | 235/156 |
| 3,761,698 | 9/1973 | Stephenson | 235/164 |

OTHER PUBLICATIONS

R. R. Shively, "A Digital Processor to Generate Spectra in Real Time," IEEE Tran. on Computers, May '68, pp. 485–491

P. D. Welch, "A Fixed–Pt FFT Error Analysis," IEEE Tran. on Audio & Electroacoustics, June '69, pp. 151–157

C. J. Weinstein, "Roundoff Noise in Fl. Pt. FFT Computation," IEEE Tran. on Audio & Electro, Sept. '69, pp. 209–215

M. L. Stein & W. D. Munro, "Scaling Machine Arithmetic," IEEE Trans. on Computers, June '71, pp. 675–678

*Primary Examiner*—Malcolm A. Morrison
*Assistant Examiner*—David H. Malzahn
*Attorney, Agent, or Firm*—Edward J. Norton; Carl M. Wright

[57] ABSTRACT

System for performing complex Fourier operations of multiplying a fixed complex number by a floating point complex number and adding to the resulting product another floating point complex number.

6 Claims, 9 Drawing Figures

FAST FOURIER TRANSFORM STAGE USING FLOATING POINT NUMBERS

BACKGROUND OF THE INVENTION

Convolutions in the time domain are handled in the frequency domain by multiplication of transforms. This has proved especially useful in extracting the frequency components of aperiodic waveforms using Fourier transform methods.

The development of the Fast Fourier Transform (FFT) has extended the use of Fourier transforms to digital filtering techniques. Pipeline FFT's make possible real time digital filtering, useful for separating signals from noise. In digital filtering, the input signals are sample data points that represent amplitude and phase information and are reduced to complex binary numbers which are processed to extract weighted impulse function values. The processing is performed by combinations of ordered complex multiplications and complex additions.

The input and output data can usually be represented by fewer binary digits (bits) than are required for maintaining significance in the complex operation steps. As a result, pipeline FFT numbers are about 15 bits long, a compromise between accuracy and speed, and for $N$ data points, there are $\log_2 N$ complex arithmetic stages. The use of fixed point arithmetic in these stages requires a large number of bits representing each value, but the use of floating point arithmetic requires many additional functions which tend to offset the advantage of using fewer bits.

BRIEF DESCRIPTION OF THE INVENTION

An apparatus for multiplying a fixed point complex number by a floating point complex number and adding to the product thereby obtained a second floating point complex number, has a complex multiplier to which are applied the ordered pairs of the fixed complex number and the mantissas of the first floating point complex number. The relative magnitudes of the exponents of the floating point complex numbers are compared and two scalers, responsive to the comparison results, modify the signals representing the complex product and the second floating point complex number. The modified signals are applied to a complex adder and the resulting sum and output exponent are adjusted in accordance with any carry produced.

DETAILED DESCRIPTION

Figure 1:
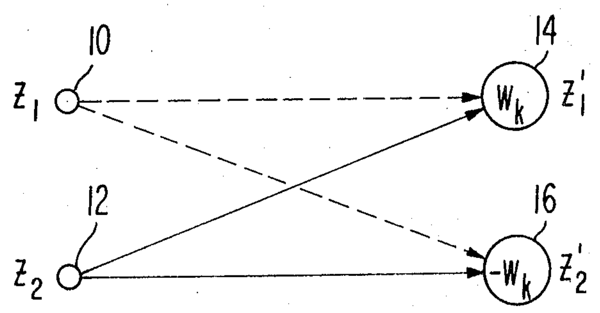
FIG. 1 is an illustration of the complex operations in an FFT stage.

The basic complex arithmetic of an FFT stage is represented by the butterfly diagram shown in FIG. 1.

For N sample points, the complex operation is performed $(N/2)\ \mathrm{int}(\log_2 N)$ times. (The $\mathrm{int}(\log_2 N)$ indicates the smallest integer equal to or greater than $\log_2 N$.) The input values of a single operation shown in FIG. 1 are the complex numbers $Z_1$ and $Z_2$.

The butterfly diagram of FIG. 1 indicates the following steps. The nodes representing complex values connected by solid lines indicate multiplication of the input complex value by the complex constant circled at the terminal node. The input complex value connected to an output node by a dotted line is added to the resulting product.

In FIG. 1, the node 10 represents the complex value $Z_1$ given in polar coordinates by $$Z_1 = A_1 \exp(j\theta_1).$$

The node 12 represents the complex value $Z_2$ given by $$Z_2 = A_2 \exp(j\theta_2).$$

The complex constant $W_k$ is equal to $\exp(j\theta_k)$. The result nodes 14 and 16 are respectively $Z_1'$ and $Z_2'$, complex output values. The complex operation indicated by FIG. 1 is $$Z_1' = Z_1 + W_k Z_2, \text{ and}$$

$$Z_2' = Z_1 - W_k Z_2.$$

In polar coordinates, $$Z_1' = A_1 \exp(j\theta_1) + A_2 \exp[y(\theta_k + \theta_2)], \text{ and}$$

$$Z_2' = A_1 \exp(j\theta_1) - A_2 \exp[j(\theta_k + \theta_2)].$$

The complex operation depicted by the butterfly diagram is equivalent to the complex matrix multiplication $$\begin{bmatrix} Z_1' \\ Z_2' \end{bmatrix} = \begin{bmatrix} 1 & W_k \\ 1 & -W_k \end{bmatrix} \begin{bmatrix} Z_1 \\ Z_2 \end{bmatrix}$$

Because of the addition step in the complex Fourier operation, the complex values are usually expressed in cartesian coordinates.

The complex input values are the sum of in-phase ($I$) and quadrature ($Q$) components, e.g., $$Z_1 = A_1 \cos\theta_1 + j A_1 \sin\theta_1 = I_{Z1} + j\, Q_{Z1}.$$

The use of floating point arithmetic operations complicates the implementation of a processor used for FFT solutions. Therefore, the components $I_{Z1}$ and $Q_{Z1}$ are usually coded as simple p-bit binary words. The number of quantization bits ($p$) required may be quite high depending on the number of transform coefficients ($N$) being computed. If the number of quantization bits at the input nodes is $p_i$, then, in an $N$-point FFT, the number of bits necessary to avoid saturation in the processor is $$p = p_i + \mathrm{int}(\log_2 N).$$

For example, a digital filter using two 1,024-point FFT's with eight bits input quantization require 18 bits quantization in the last stage of the $\mathrm{int}(\log_2 N)$ stages of the FFT computation. This bit growth in the processor can be avoided to some extent by renormalization (division by 2) of the data at every stage in which saturation is anticipated. Unfortunately, the points where saturation may occur cannot be predicted exactly because of the variations in the nature of the input data to be transformed. A typical system which has a potential requirement of 18 bits quantization may be implemented with 12 to 15 bits as a compromise and employ renormalization based on the expected input data characteristics.

The floating point implementation disclosed herein forces both the $I$ and $Q$ samples of a complex value to the same floating point level; that is, both values of the ordered pairs have the same exponent. This is equivalent to expressing the sample data (and intermediate results) in the form $$Z_1 = (x + jy)2^n \text{ and } Z_2 = (a + jb)2^m .$$

Using this technique, for example, it is possible for an $I$ or $Q$ word to be carried as $2^M$ times zero, where $M$ is an integer, if the magnitude of either the $I$ or $Q$ component of a complex word exceeds the other by more than $2^p$, where p is the number of quantization bits used. Computer simulations of the process have shown no degradation in performance due to this feature.

To further simplify the implementation, the floating point exponents are incremented in the positive direction only. That is, even though a particular sample may have $I$ and $Q$ components which are less than the maximum level, no provision is made to fill these words and reduce the floating point exponent accordingly.

The effective computational noise level estimated for 9, 11 and 13 bit (including sign) cases based on computer simulations of digital filters varies from −35 to −45 dB referred to the peak signal level. With the floating point processor, a 9 bit implementation provides −70 dB computational noise, 25 dB better than the 13 bit fixed point implementation. To achieve the −70 dB level with a fixed point processor would probably require about 18 or 19 bits quantization. The multiplier required to implement the nine bit quantization has a complexity level of only 64 compared to 324 for the 19 bit processor, a reduction of about 80 percent.

Figure 2:
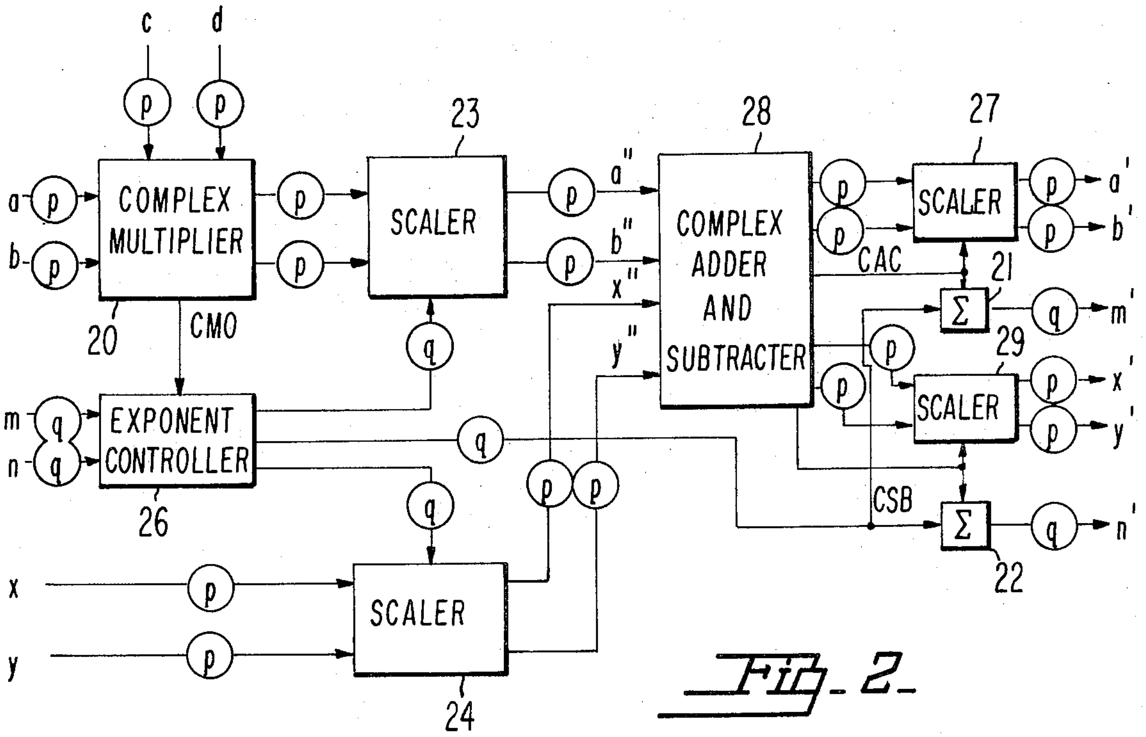
FIG. 2 is a block diagram of a preferred embodiment of the invention.

FIG. 2 is an illustration of a preferred embodiment for performing the floating point complex operations according to the invention. The signals representing the mantissa of the complex value $Z_2$ $(a, b)$ and those representing the complex constant $W_k$ $(c, d)$ are the input signals to a complex multiplier 20. The complex product from the multiplier output is coupled to a scaler 23. (The circled lower case letter indicates the number of conductors represented by the associated line. The p bits of mantissa value include the sign bit.)

The signals representing the mantissa of the complex value $Z_1$ $(x, y)$ are coupled to another scaler 24. The scalers 23 and 24 are controlled by an exponent controller 26, to which the signals representing the exponents of the $Z_1$ and $Z_2$ values are applied. The purpose of the scalers 23 and 24 is to change the floating point complex numbers to values having the same exponent for proper addition and subtraction in a complex adder and subtracter 28. The scaling is accomplished by shifting the bits of the value with the smaller exponent to the right by a number of stages equal to the difference between exponents. The exponent control 26 is also responsive to a signal from the complex multiplier 20 for correcting the exponent values in case of product overflow.

The output signals from the complex adder and subtracter 28 are coupled to the scalers 27 and 29 to adjust the output values when a carry or borrow occurs in the adder or subtracter, respectively.

The output exponents are taken as the larger of $n$ and $m$ to which 1 might be added in response to an overflow signal from the complex multiplier 20 and to which 1 might be added to each individual value by the adders 21 and 22 in case of a carry or borrow, respectively, from the complex adder and subtracter 28.

The complex output values from the apparatus described and shown in FIG. 2 are $$Z_1' = (a' + jb')2^{m''} \quad \text{and}$$

$$Z_2' = (x' + jy')2^{n''}$$

where $$a' = \begin{cases} ac - bd + x/2^{m''-n} & \text{if } m'' \geq n \\ (ac - bd)/2^{n-m''} + x & \text{if } m''<n \end{cases}$$

$$b' = \begin{cases} ad + bc + y/2^{m''-n} & \text{if } m'' \geq n \\ (ad + bc)/2^{n-m''} + y & \text{if } m''<n \end{cases}$$

$$x' = \begin{cases} ac - bd - x/2^{m''-n} & \text{if } m'' \geq n \\ (ac - bd)/2^{n''\ m''} - x & \text{if } m''<n \end{cases}$$

$$y' = \begin{cases} ad + bc - y/2^{m''-n} & \text{if } m'' \geq n \\ (ad + bc)/2^{n-m''} - y & \text{if } m''<n \end{cases}$$

$$m'' = m + CMO,$$

$$m' = MAX\ (m'', n) + \text{CAC, and}$$

$$n' = \text{MAX}\ (m'', n) + \text{CSB}.$$

The symbol MAC $(m'', n)$ indicates a quantity that is equal to the greater of $m''$ *and* $n$. The abbreviation CMO indicates Complex Multiplier Overflow; CAC, Complex Adder Carry; and CSB, Complex Subtracter Borrow. Each value CMO, CAC, and CSB will be 0 or 1.

A complex operation FFT stage according to the invention can be implemented to handle data in either a serial or a parallel mode. The serial mode reduces system hardware and sacrifices speed whereas the parallel mode increases speed at the expense of increased system hardware. For purposes of illustration, a parallel mode implementation is described, but it will be clear to one of ordinary skill in the art how to implement a system for practicing the invention in the serial mode.

The logic devices represented by gate symbols in the drawings operate according to the following rules.

An Exclusive − OR (XOR) gate produces a true output signal when the input signals are complementary, i.e., when one input signal is true and the other is false. If both input signals are ture or if both are false, then the output signal is false.

The values of true and false are represented by two voltage levels. Following the usual conventions, a logical true value will be represented by the higher voltage level and may be referred to as a logical one or, simply, high. A logical false value will be represented by the lower voltage level and may be referred to as a logical zero, or low.

An AND gate produces a logical one output signal only if all input signals are logical ones. If any input signal is a logical zero, the output signal will be a logical zero.

An OR gate produces a logical one output signal if any input signal is a logical one. Only if all input signals are logical zeroes will the output signal be a logical zero.

An INVERTER produces an output signal that is the inverse (complement) of the input signal. If the input signal is a logical zero, the output signal will be a logical one; if the input signal is a logical one, the output signal will be a logical zero.

Other gates, such as a NOR gate (equivalent to an OR gate with the output signal inverted) or a NAND gate (equivalent to an AND gate with the output signal inverted), can be used instead of the gates shown in the drawings. Such substitutions are within the skill of the art so that only AND gates, OR gates, INVERTERS, and general function blocks will be used in the explanation of the invention.

Figure 3:
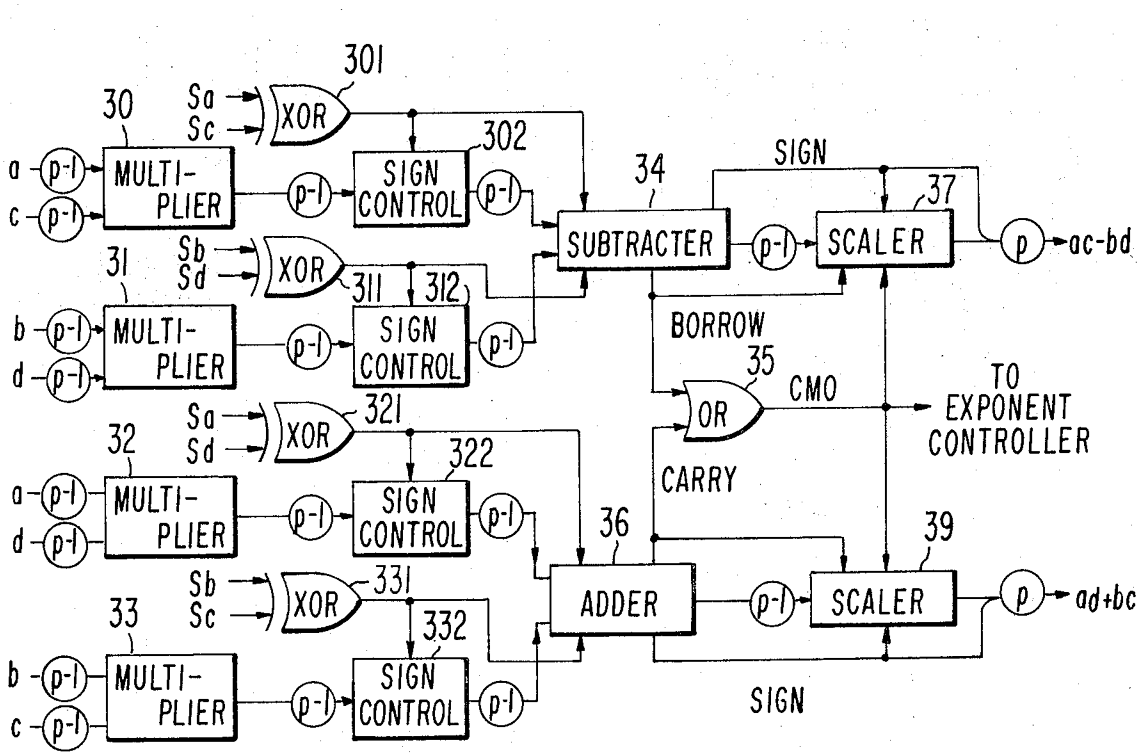
FIG. 3 is a detailed block diagram of a complex multiplier.

The complex multiplier 20 (FIG. 2) is shown in more detail in FIG. 3. The signals representing the values *a* and *c* are applied as input values to a multiplier 30; those representing b and d, to a multiplier 31; those representing *a* and *d*, to a multiplier 32; and those representing *b* and *c*, to a multiplier 33. The binary multipliers 30, 31, 32 and 33 are well known in the art and need not be explained in detail for an understanding of the invention. Examples of such multipliers can be found in the literature; see, for example, C. Ghest, "Multiplying Made Easy for Digital Assemblies," *Electronics*, Nov. 22, 1971, pp. 56–61.

The sign controls 302, 312, 322 and 332 coupled to the output terminals of the binary multipliers 30, 31, 32 and 33, respectively, are responsive respectively to the output signals from the XOR gates 301, 311, 321 and 331, to which the sign bits of the associated pairs of value signals are coupled. $S_a$ signifies the sign bit of the value *a*, and so on.

Each input value to the binary multipliers 30–33 comprises p-1 bits. Only the most significant p-1 bits of the product from each multiplier are used as output signals.

The product signals are coupled to the sign control circuits 302, 312, 322, or 332 to conform them to their sign. The operation of the sign control circuits depends on the form in which negative numbers are expressed. Two common forms are the 1's complement and the 2's complement.

The 1's complement is formed by inverting each binary digit of the value. Thus, the 1's complement of 1010010 is 0101101.

The 2's complement is formed by adding binary 1 to the 1's complement. Thus, the 2's complement of 1010010 is 0101110.

Figure 4:
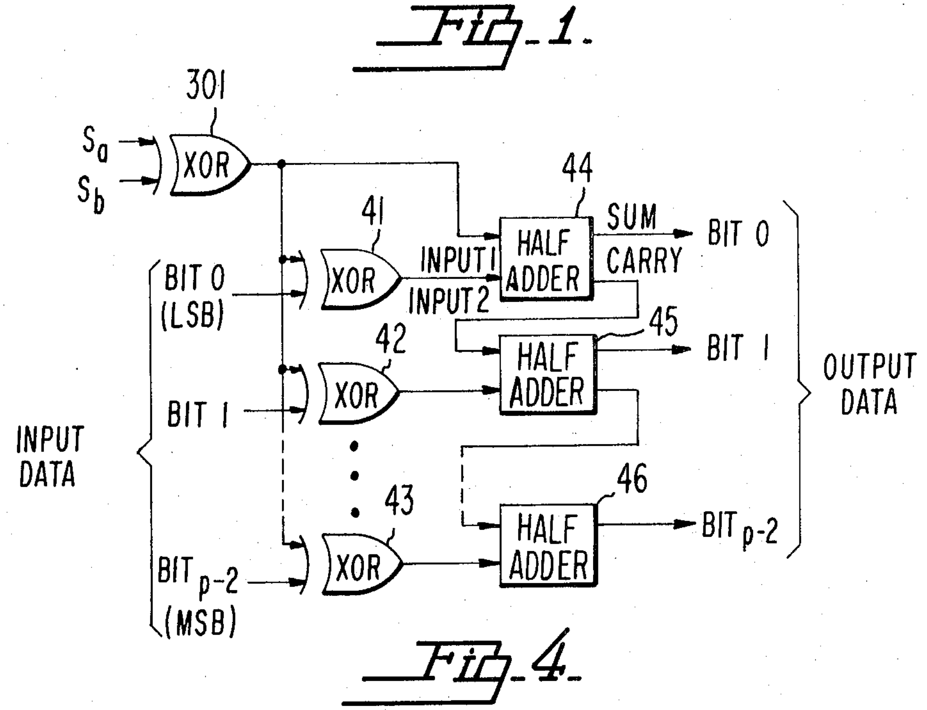
FIG. 4 is a logic diagram of a sign control circuit.

FIG. 4 is an illustration of a circuit that can be used for sign control. The XOR gate 301 produces a logical zero output signal representing a positive sign when the operand signals are like, i.e., both positive (logical zeroes) or both negative (logical ones). The output signal of the XOR gate 301 is a logical one when the operand signs are unlike.

The output signal of the XOR gate 301 is an input signal to each of p-1 XOR gates 41–43 of which only three are shown. The second input signal to each of the XOR gates 41–43 is a bit signal.

When the output signal of the XOR gate 301 is a logical zero, the output signal of each of the XOR gates 41–43 has the same logical value as its associated input bit signal. That is, when the operand signals are like, the bit signals are unchanged.

When the output signal of the XOR gate 301 is a logical one, the output signal of each of the XOR gates 41–43 will be the logical complement of its input bit signal. That is, when the operand signs are unlike, each bit signal is inverted. The output signals of the XOR gates 41–43 will therefore be the 1's complement of the input data.

If, however, the 2's complement of the input data is required, a value of 1 must be added to the 1's complement. To add a 1, p-1 half-adders 44–46, of which only three are shown, are coupled to the output signals of the XOR gates 41–43.

Figure 5:
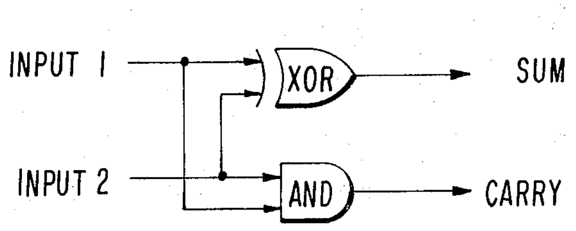
FIG. 5 is a logic diagram of a half-adder.

A half-adder produces two output signals, SUM and CARRY, in response to two input signals. A SUM output signal of logical one is produced when the input signals are complementary. A CARRY output signal of logical one is produced only when both input signals are logical ones. From this description, it is clear that each half-adder can be implemented using an XOR gate and an AND gate as shown in FIG. 5.

In FIG. 4, a logical zero output signal from the XOR gate 301 into the half-adder 44 causes the SUM output signal of the latter to be the output signal of the XOR gate 41. It also causes the CARRY output signal to be a logical zero. Therefore, the SUM output signal of the half-adder 45 is the same as the output signal of the XOR gate 42, and the CARRY output signal is a logical zero. The same conditions exist for all the remaining half-adders because each first input signal will be a logical zero. Therefore, when the output signal of the XOR gate 301 is a logical zero, the output data is equal to the input data.

If the output signal of the XOR gate 301 is a logical one, the 1's complement of the input data is coupled to the half-adders 44–46 and an input signal of logical one is coupled to the first input of the half-adder 44, which corresponds to the least significant bit position. The resulting output signals will be the 2's complement of the input data.

IN FIG. 3, the p-1 output signals from the sign control circuits 302 and 312 are the data input signals to a subtracter 34; the p-1 output signals from the sign control circuits 322 and 332 are the data input signals to an adder 36. The sign input signals to the subtracter 34 are the output signals of the XOR gates 301 and 311; the sign input signals to the adder 36 are the output signals from the XOR gates 321 and 331.

The output signals from each of the subtracter 34 and the adder 36 are p-1 result signals, a borrow (or carry) signal, and a sign signal.

The operation of subtracters and adders are well known in the art and need not be explained in detail to understand the invention. (See, for example, the commercially available Texas Instruments SN74181 logical function integrated circuit application notes.)

The result bits from the subtracter 34 and from the adder 36 are coupled to scalers 37 and 39, respectively, the function of which is to adjust the data bits in case of a borrow from the subtracter or a carry from the adder. Both results must be adjusted because both represent mantissas having the same exponent.

If a borrow results from the most significant stage of the subtracter 34 or if a carry results from the most significant stage of the adder 36, or both, at least one input signal of an OR gate 35 will be a logical one, causing a logical one output signal from the latter, which indicates an overflow from the complex multiplier (CMO).

The CMO signal is coupled to the exponent controller to increase the proper exponent value in case of an overflow.

When an overflow occurs, the output bits from the subtracter 34 and from the adder 36 are each shifted to the next less significant bit position and the proper bit inserted at the most significant bit (MSB) stage. The proper MSB is defined as the sign bit or the borrow bit for the subtracter scaler 37 or as the sign bit or carry bit for the adder scaler 39.

The borrow (or carry) bit represents a high order bit value. The reason for inserting the sign bit is that the empty MSB should be the same as the sign. For example, 0.010110 represents +22, the bit preceding the binary point being the sign. When shifted one bit position to the right (division by 2), the result is 0.001011, which is +11. On the other hand, 1.101010 represents −22 in 2's complement notation. When shifted one bit position to the right, the result must be 1.110101 in order to represent −11 in 2's complement notation. The empty space in the positive number was filled with a zero and, in the negative number, with a one.

Figure 6:
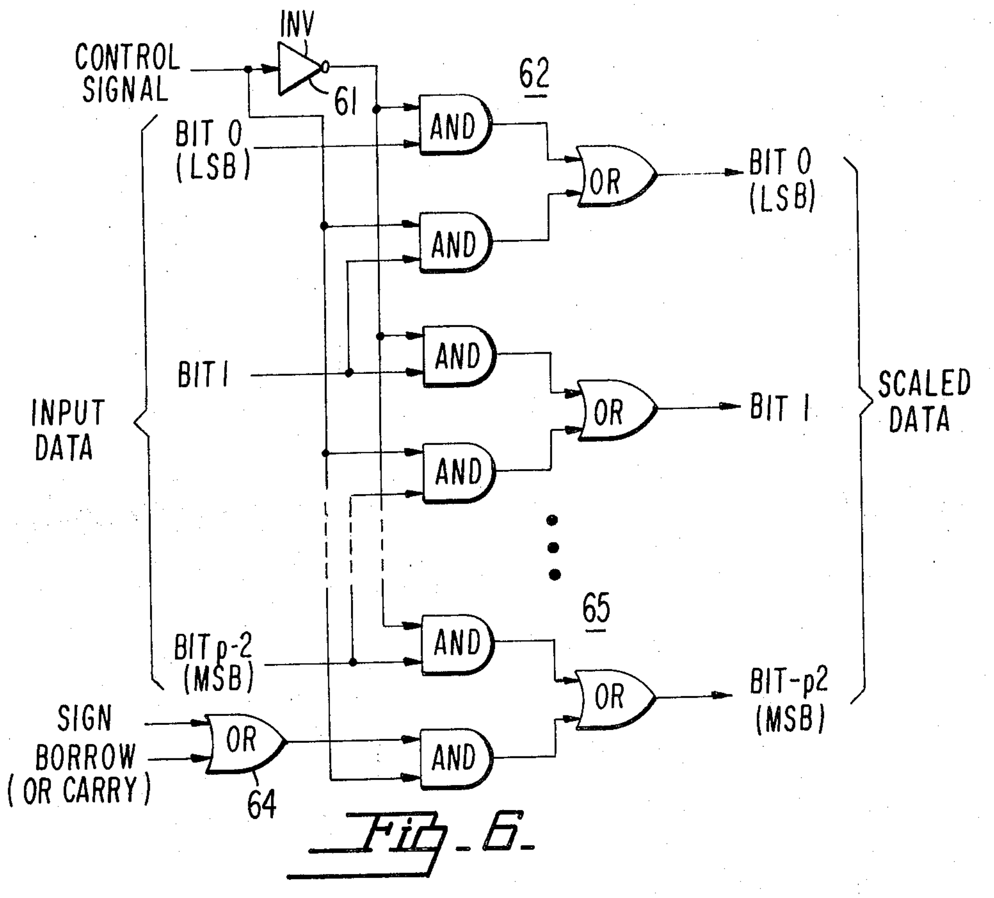
FIG. 6 is a logic diagram of a one position scaler.

FIG. 6 illustrates a circuit that will operate as a scaler according to the above description. A control signal, which corresponds to the CMO signal from the OR gate 35 (FIG. 3), is coupled to an INVERTER 61. There p-1 groups of AND-OR gates, such as the AND-OR gate group 62, of which only three are illustrated. Each AND-OR gate group corresponds to an input data bit position. A first AND gate of each group is primed by the inverted control signal. The other input signal of the first AND gate in each group is a corresponding bit signal of input data.

The second AND gate of each group is primed by the control signal, and the other input signal of each (except the MSB group) is the bit signal associated with the next more significant bit position. The second input signal of the second AND gate in the MSB AND-OR gate group is the output signal of an OR gate 64, the input signals to which are the sign signal and the BORROW (or CARRY) signal.

If the control signal is a logical zero, the inverted control signal is a logical one which gates the bit input signals to the scaled data output lines in their same bit positions.

If the control signal is a logical one, the bit input signals are gated to the scaled data output lines in the next less significant bit position, the MSB output being a bit value as defined above.

The p-1 output signals from the scalers 37 and 39 (FIG. 3) together with the associated sign bits are the output signals from the complex multiplier 20 in FIG. 2. These signals are coupled to a scaler 23 and the input signals representing $Z_1$ $(x, y)$ are coupled to a scaler 24. Each scaler 23, 24 is responsive to q output signals from the exponent controller 26.

The functions of the exponent controller 26 are providing a scaling factor to either scaler 23 or 24 but not both and gating the larger exponent to the output adders 21 and 22. The input signals to the exponent controller 26 are the exponents $m$ and $n$, each comprised of $q$ bits. In case of a CMO signal, the exponent m must be incremented by one.

Figure 7:
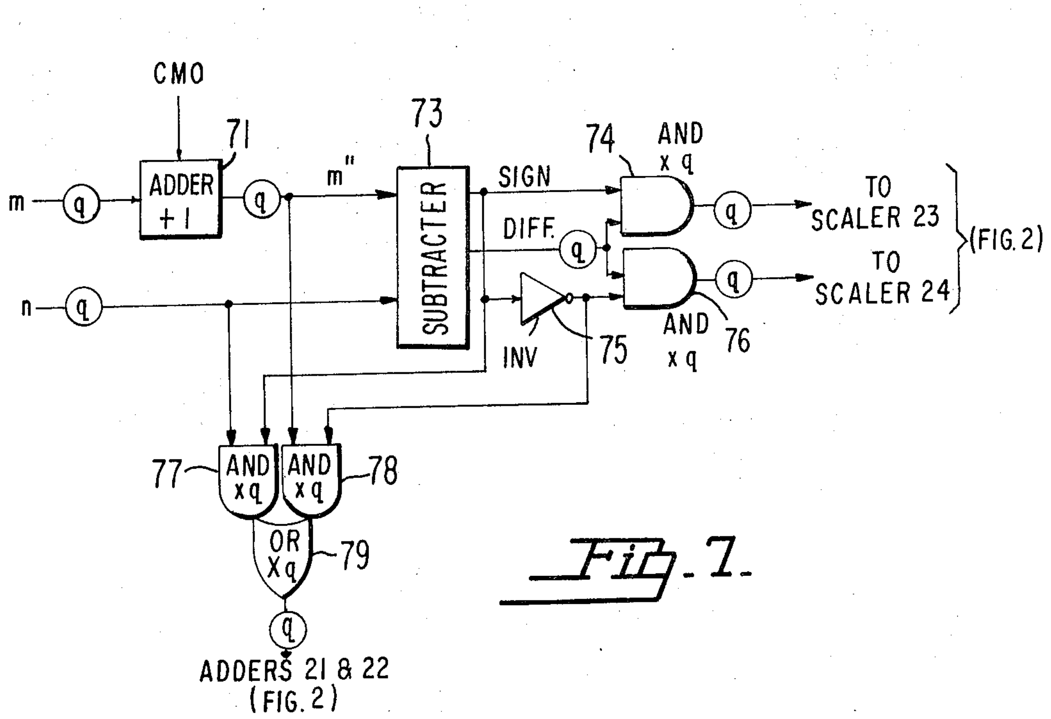
FIG. 7 is a logic diagram of an exponent controller.

FIG. 7 is an illustration of a suitable circuit for performing the functions of the exponent controller.

The $q$ bits of the $m$ exponent are applied to an adder 71 which operates in the same manner as the cascaded half-adders described for the sign control and shown in FIG. 4. The first input of the first half-adder is the CMO signal and there are $q$ stages. The output signals from the adder 71 will be a binary value equal to $m$ if the CMO signal is a logical zero or equal to $m + l$ if the CMO signal is a logical one. This value is designated $m''$.

The signals representing $m''$ and $n$ are applied as input signals to a subtracter 73. The output signals from the subtracter 73 are q bits representing the value of the difference $m'' - n$ and a sign bit. Such subtracters are well known and need not be described in detail. In order to provide the absolute value of the difference, a 2's complementer such as described and shown above (FIG. 4) can be used in the subtracter to modify the output value when the sign bit is a logical one indicating a negative value.

A sign bit with a value of logical one indicates that the n exponent is larger than the $m''$ exponent so that the binary output value from the complex multiplier 20 (FIG. 2) must be shifted to the right $m'' - n$ bit positions. Therefore, the sign bit is applied as an input signal to $q$ AND gates 74, the other input signals of which are the $q$ difference bits specifying the $m'' - n$ value.

The sign bit is also applied as an input signal to $q$ AND gates 77, the other input signals of which are the $q$ bits specifying the value of $n$. The output signals of the $q$ AND gates 77 are coupled to the output adders 21 and 22 (FIG. 2) via q OR gates 79.

(The notation $xq$ in the figure signifies each symbol represents $q$ gates.)

The sign bit is inverted by an INVERTER 75 so that when $m''$ is greater than $n$, the sign bit of logical zero will be inverted to a logical one. This condition will enable the $q$ AND gates 76 to couple the difference bits to the scaler 24 (FIG. 2) to shift the $n$ value bits $m'' - n$ bit positions to the right. The logical one output signal from the INVERTER 75 will also enable the $q$ AND gates 78 to couple the $m''$ signals to the output adders via the $q$ OR gates 79.

Figure 8:
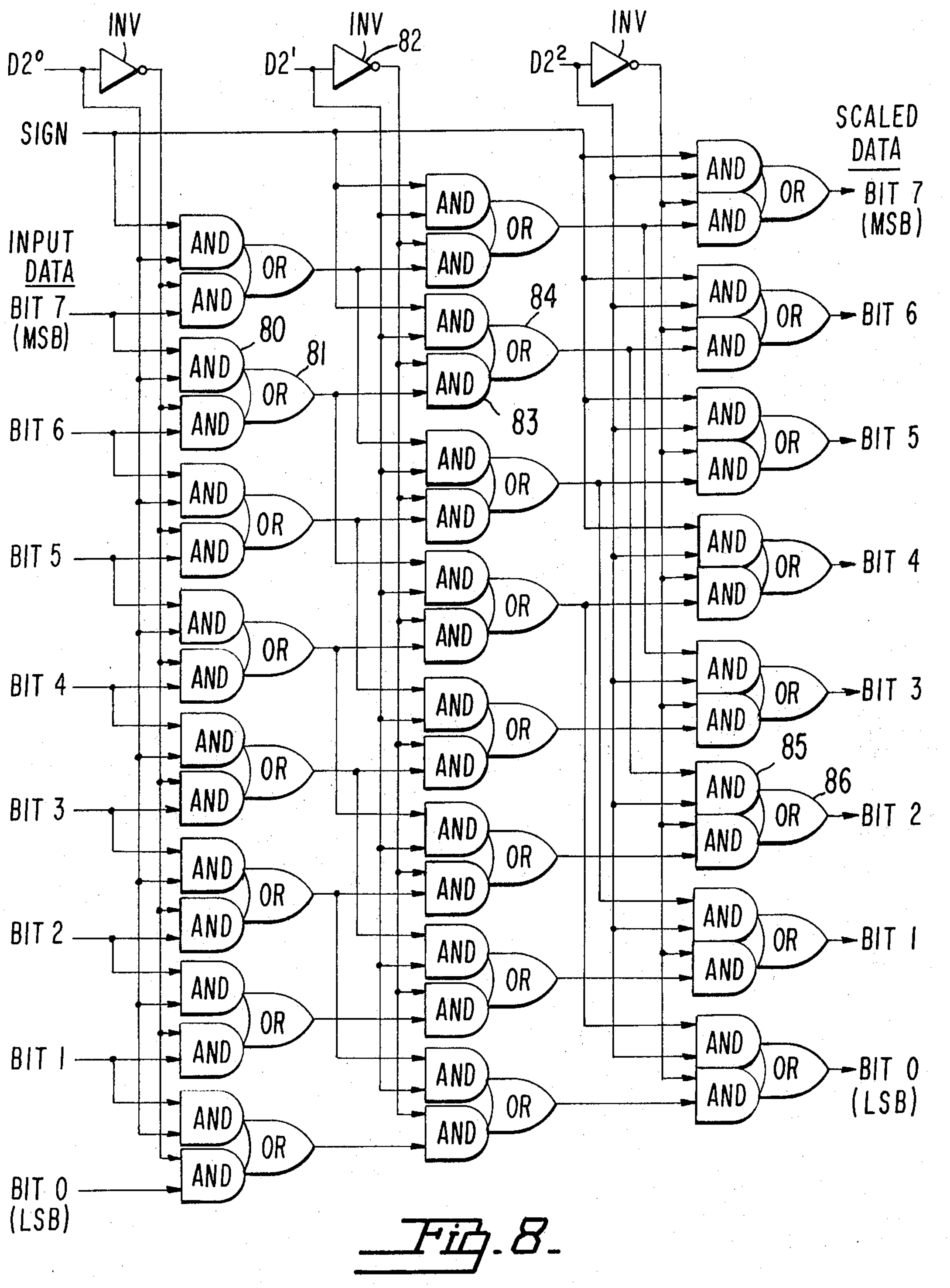
FIG. 8 is a logic diagram of a multi-position scaler.

FIG. 8 illustrates a circuit for performing the function of a scaler. For purposes of illustration, the input data is represented by eight bits and the difference value from the exponent controller, by three bits: $D2^0$, $D2^1$, and $D2^2$.

The scaler of FIG. 8 is composed of three columns of eight AND-OR gate groups each. The first AND gate of each gate group in each column is primed by a difference bit. The second AND gate of each group is primed by a difference bit inverted.

The other input signals to the second AND gates in each group are associated bit signals. For the first column of gate groups, the associated bit signals are the input data bits; for the second column, the OR gate output signals from corresponding stages of the first column; and for the third column, the OR gate output signals from corresponding stages of the second column. The OR gate output signals from the third column are the scaled data output signals.

The other input signals to the first AND gates of each group are those other input signals coupled to the second gates $i$ bit positions more significant than the associated stages. The value of i is related to the column number $c$ by $i = 2^{c-} 1$, i.e., for the first column $i = 1$; for the second, $i = 2$; and for the third, $i = 4$. The resulting empty inputs are coupled to the sign bit for the reasons discussed above for the scalers in the complex multiplier.

The difference bit controlling each column also represents a difference value equal to *i*. Therefore, the scaled data output signals will be equal to the input data signals shifted to the right a number of bit positions corresponding to the difference value.

The difference bit $D2^0$ represents a difference value of 1. If $D2^0 = 0$, the input bits are not shifted. If $D2^0 = 1$, the input bits will be shifted one bit position to the right, i.e., in the less significant direction.

The difference bit $D2^1$ represents a difference value of 2. If $D2^1 = 0$, the bits from the first column are not shifted. If $D2^1 = 1$, the bits from the first column will be shifted two bit positions to the right.

The difference bit $D2^2$ represents a difference value of 4. If $D2^2 = 0$, the bits from the second column are not shifted. If $D2^2 = 1$, the bits from the second column are shifted four bit positions to the right.

By way of example, it will be assumed that the difference $m'' - n$ is 5. Consequently, $D2^2 = 1$, $D2^1 = 0$, and $D2^0 = 1$. A bit 7 value of logical one will be traced through the scaler.

The $D2^0 = 1$ value causes the bit 7 value applied to the AND gate 80 to appear as the output signal of the OR gate 81.

The $D2^1 = 0$ value is inverted to a logical one by the INVERTER 82 so that the output signal of the OR gate 81 applied to the AND gate 83 will appear as the output signal of the OR gate 84.

The $D2^2 = 1$ causes the output signal of the OR gate 84 applied to the AND gate 85 to appear as the output signal of the OR gate 86.

Thus, the input data bit 7 will be the scaled data output bit 2, that is, shifted 5 bit positions to the right.

In FIG. 2, each scaler 23 and 24 comprises two of the circuits shown in FIG. 8.

The values representing $Z_1$ $(x, y)$ after being scaled will be referred to as $x''$ and $y''$. The values representing $ac - bd$ and $ad + bc$ after scaling will be referred to as $a''$ and $b''$, respectively.

Figure 9:
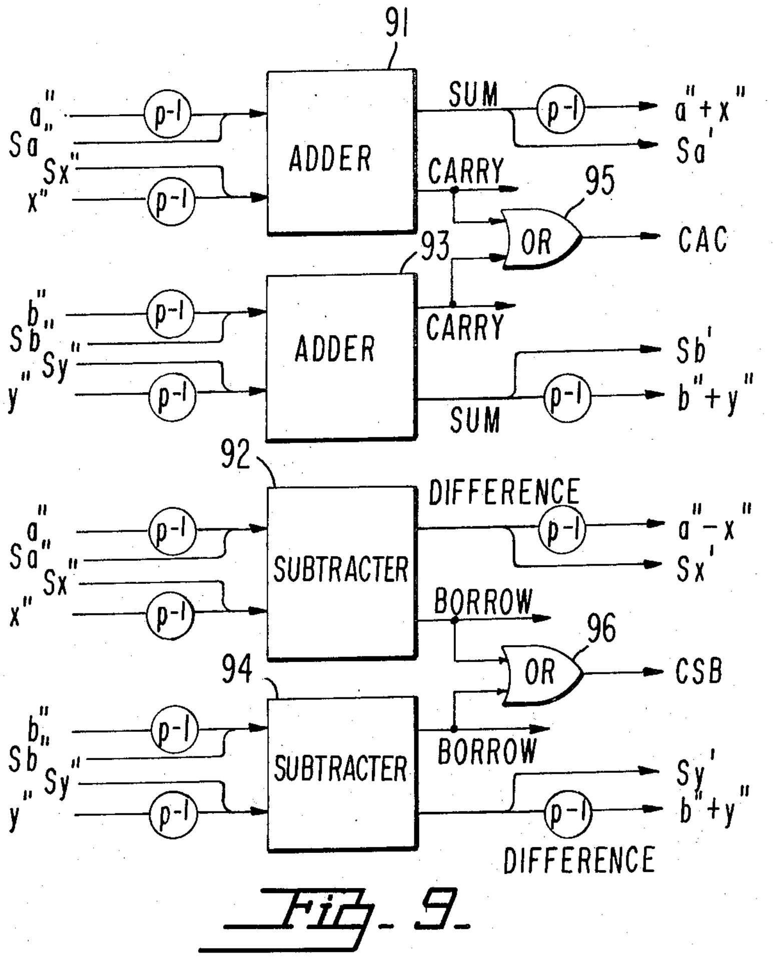
FIG. 9 is a block diagram of a complex adder-subtracter.

The scaled data output bits from the scalers 23 and 24 in FIG. 2 are coupled to a complex adder and subtracter 28, the details of which are shown in FIG. 9.

In FIG. 9, two adders 91 and 93 add the binary values of $a''$ to $x''$ and $b''$ to $y''$, respectively. Two subtracters 92 and 94 subtract the binary values of $x''$ from $a''$ and $y''$ from $b''$, respectively.

Such adders and subtracters are well known in the art and need not be described in detail.

The carry output signals from the adders 91 and 93 are input signals to an OR gate 95 which produces the CAC signal. The CAC signal controls the output adder 21 and the scaler 27 (FIG. 2) to which the sum bits, output sign bits, and carry bits are applied as input signals.

In a similar manner, the borrow output signals are combined in an OR gate 96 to produce the CSB signal, which controls the scaler 29 and adder 22 (FIG. 2). The difference bits, output sign bits, and borrow bits are the input signals to the scaler 29 (FIG. 2).

The sign signals $S_{a''}$ and $S_{b''}$ are the sign output signals from the subtracter 34 and adder 36 (FIG. 3), respectively. The sign signals $S_x$ and $S_y$ are the input sign bits of the complex value $Z_1$ $(x, y)$.

The $S_{a'}$, $S_{b'}$, $S_{x'}$, and $S_{y'}$ sign bits from the complex adder and subtracter are the output sign bits.

The data output signals from the complex adder and subtracter 28 in FIG. 2 are scaled appropriately if CAC or CSB are generated. Each number of a complex pair must be scaled as described above for the complex multiplier. The scalers 27 and 29 can be implemented using two of the circuits described and shown in FIG. 6 for each scaler. The control signal for the scaler 27 is the CAC signal and, for the scaler 29, the CSB signal.

The output adders 21 and 22 correct the output exponent signals to conform to the scaling. Such adders have been described above as implemented by half-adders.

The system described is capable of performing complex arithmetical functions at high speed and is especially useful in pipeline, FFT systems.

Various modifications to the systems and circuits described and illustrated to explain the concepts of the invention might be made by those of ordinary skill in the art within the principle and scope of the invention as expressed in the appended claims.

What is claimed is:

1. An apparatus for multiplying a fixed point complex number times a first floating point complex number and adding to the product thereby obtained a second floating point complex number, comprising the combination of:

complex multiplier means having two input means and an output means;

means for applying to the first input means of said multiplier means the signals representing the fixed point complex number;

means for applying to the second input means of said multiplier means the signals representing the mantissas of the first floating point complex number;

exponent controller means responsive to signals representing the exponents of the first and second floating point complex numbers for producing output signals indicative of the relative magnitudes of the exponents of the floating point complex numbers and for producing output signals indicative of the larger of said exponents;

first scaler means responsive to the output signals from said exponent controller means for modifying the signals from the output means of the multiplier means;

second scaler means responsive to the output signals from said exponent controller means for modifying the signals representing the mantissas of the second floating point complex number;

adder means responsive to the modified signals from the first and second scaler means for producing output signals representing the complex sum and carry of said modified signals; and sum exponent means responsive to said carry output signal for modifying the signals representing the larger input exponent value to produce output signals representative of the exponent of said adder output signals.

2. The invention as claimed in claim 1 further including:

subtracter means responsive to the modified signals from the first and second scaler means for producing output signals representing the complex difference and borrow of said modified signals; and difference exponent means responsive to said borrow output signal for modifying the signals representing the larger input exponent value to produce output signals representative of the exponent of said subtracter output signals.

3. The invention as claimed in claim 2 wherein:

said sum exponent means and difference exponent means include adders for monotonically increasing said exponent values in response to carry and borrow signals, respectively.

4. The invention as claimed in claim 2 wherein said exponent contoller means includes:

exponent subtracter means responsive to signals representing the exponents of the first and second floating point complex numbers for producing output signals representative of the absolute value of the difference between said exponents and an associated sign;

means responsive to said sign signal for coupling said difference output signals to one of the scaler means when said sign signal has one value and to the other one of the scaler means when said signal has another value; and means for producing output exponent signals equal to the exponent signals of the first floating point complex number when said sign signal has one value and equal to the exponent signals of the second floating point complex number when said sign signal has another value.

5. The invention as claimed in claim 4 wherein said exponent controller means further includes:

means responsive to an overflow condition signal from said complex multiplier for incrementing the exponent value of the first floating point complex number before signals representing said exponent are applied to the exponent subtracter means.

6. The invention as claimed in claim 4 wherein said first and second scalers modify signals representing complex numbers by dividing said numbers by integral multiples of their radix.

* * * * *

UNITED STATES PATENT OFFICE
CERTIFICATE OF CORRECTION

Patent No. 3,800,130 Dated March 26, 1974

Inventor(s) Lloyd William Martinson and Richard James Smith

It is certified that error appears in the above-identified patent and that said Letters Patent are hereby corrected as shown below:

Column 2, line 30 "y" should be --j--;
Column 4, line 12 " m" " should be --m'--;
Column 4, line 13 " n" " should be --n'--;
Column 4, line 16 "$x/2^{m''}$ $^{-n}$" should be --$x/2^{m''-n}$--;
Column 4, line 17 "$/2^{n-m''}$ + x" should be --$/2^{n-m''}$+ x--;
Column 4, line 19 "$y/2^{m''}$ $^{-n}$" should be --$y/2^{m''-n}$--;
Column 4, line 21 "$/2^{n-m''}$ + y" should be --$/2^{n-m''}$ + y--;
Column 4, line 23 "$x/2^{m''}$ $^{-n}$" should be --$x/2^{m''-n}$--;
Column 4, line 24 "$/2^{n''\ \ m''}$ -x" should be --$/2^{n-m''}$-x--;
Column 4, line 25 "$y/2^{m''}$ $^{-n}$" should be --$y/2^{m''-n}$--;
Column 4, line 26 "$/2^{n-m''}$ -y" should be --$/2^{n-m''}$ -y--;
Column 4, line 53 "ture" should be --true--;
Column 8, line 67 "$2^c - 1$" should be --$2^{c-1}$--.

Signed and sealed this 22nd day of October 1974.

(SEAL)
Attest:

McCOY M. GIBSON JR.
Attesting Officer

C. MARSHALL DANN
Commissioner of Patents

FORM PO-1050 (10-69)
1530 6/72

USCOMM-DC 60376-P69
U.S. GOVERNMENT PRINTING OFFICE : 1969 O—366-334